(12) United States Patent
Ohara

(10) Patent No.: US 8,736,857 B2
(45) Date of Patent: May 27, 2014

(54) CONTROL DEVICE

(75) Inventor: Kiyotaka Ohara, Nagoya (JP)

(73) Assignee: Brother Kogyo Kabushiki Kaisha, Nagoya-shi, Aichi-ken ( * ) Notice: Subject to any disclaimer, the term of this patent is extended or adjusted under 35 U.S.C. 154(b) by 235 days.

(21) Appl. No.: 13/160,025

(22) Filed: Jun. 14, 2011

(65) Prior Publication Data
US 2012/0002222 A1 Jan. 5, 2012

(30) Foreign Application Priority Data

Jul. 5, 2010 (JP) .................................. 2010-153173

(51) Int. Cl.
*H04N 1/40* (2006.01)
(52) U.S. Cl.
USPC ........................................ 358/1.13; 358/1.15
(58) Field of Classification Search
USPC ......... 358/1.13, 1.15, 1.9, 2.1, 468, 400, 500, 358/406, 504
See application file for complete search history.

(56) References Cited

U.S. PATENT DOCUMENTS

| 6,757,070 | B1 | 6/2004 | Lin et al. | |
|---|---|---|---|---|
| 8,405,859 | B2 * | 3/2013 | Torii | 358/1.15 |
| 2003/0147092 | A1 * | 8/2003 | Kennis | 358/1.13 |
| 2005/0200873 | A1 | 9/2005 | Yamakawa et al. | |
| 2005/0219565 | A1 * | 10/2005 | Suzuki | 358/1.9 |
| 2006/0262347 | A1 | 11/2006 | Ono | |
| 2007/0299989 | A1 | 12/2007 | Maruyama | |
| 2009/0168091 | A1 | 7/2009 | Fu et al. | |
| 2009/0237724 | A1 * | 9/2009 | Furuya | 358/1.15 |
| 2011/0069341 | A1 * | 3/2011 | Kim et al. | 358/1.15 |

FOREIGN PATENT DOCUMENTS

| CN | 100476713 C | 4/2009 |
|---|---|---|
| JP | 2001-249784 A | 9/2001 |
| JP | 2004-234206 A | 8/2004 |
| JP | 2005-258721 | 9/2005 |
| JP | 2005-267541 | 9/2005 |
| JP | 2008-9967 | 1/2008 |
| JP | 2008-47069 | 2/2008 |
| JP | 2008-152545 A | 7/2008 |
| JP | 2010-072679 A | 4/2010 |

OTHER PUBLICATIONS

English language abstract only of Chinese Application No. CN 1866198 A dated Nov. 22, 2006.
Chinese Office Action dated Jul. 8, 2013 from corresponding Chinese Application No. 201110192222.4, together with an English language translation.

(Continued)

*Primary Examiner* — Thomas D Lee
*Assistant Examiner* — Stephen M Brinich
(74) *Attorney, Agent, or Firm* — Scully, Scott, Murphy & Presser PC

(57) ABSTRACT

A content of the common setting is applied to the plurality of devices and a content of the special setting is applied to a specific device among the plurality of devices. When the item of the special setting for the specific device is selected on the common setting screen, the acquiring unit is configured to acquire special setting screen data corresponding to the selected item of the special setting from an external device. A second setting screen supplying unit is configured to supply the special setting screen data to the display unit such that the display unit displays a special setting screen on which the content of the special setting for the selected item is settable.

20 Claims, 13 Drawing Sheets

(56) References Cited

OTHER PUBLICATIONS

Extended European Search Report dated Jun. 3, 2013 from related EP Application 11169692.8-1959.

Japanese Official Action dated Jan. 28, 2014 received from the Japanese Patent Office in related Japanese patent application No. 2010-153173.
European Office Action dated Feb. 7, 2014 received in corresponding European Patent application No. 11169692.8.

* cited by examiner

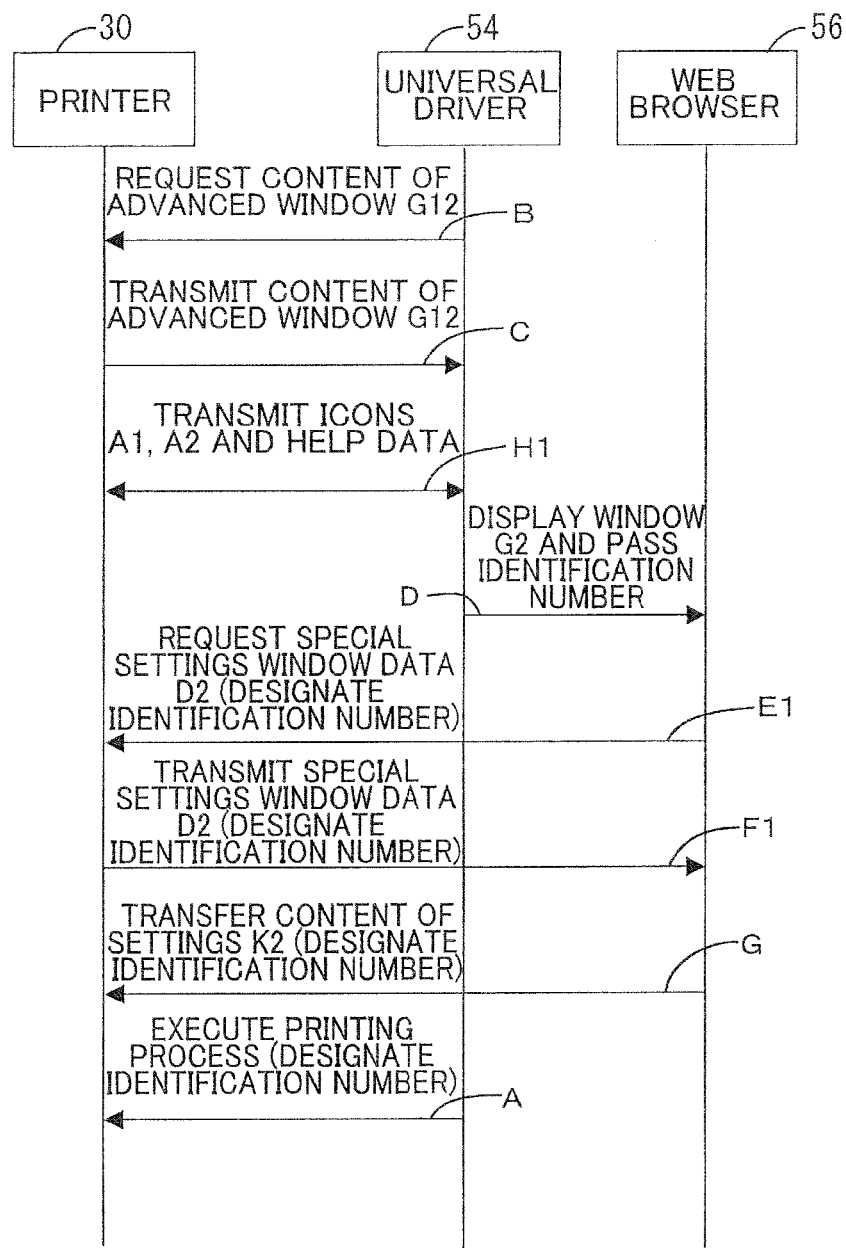

CONTROL DEVICE

CROSS REFERENCE TO RELATED APPLICATION

This application claims priority from Japanese Patent Application No. 2010-153173 filed Jul. 5, 2010. The entire content of the priority application is incorporated herein by reference.

TECHNICAL FIELD

The invention relates to a technology for controlling an image processor.

BACKGROUND

Conventionally, control devices such as personal computers have used a single driver capable of controlling a plurality of types of printers or other image processors. This driver is referred to as a universal driver. The universal driver provides a function settings window in which the user can configure common settings to be applied to all of a plurality of image processors. In addition, in order to configure special settings to be applied to specific image processors, special function settings windows may be installed in the universal driver in advance for enabling the user to configure such special settings.

SUMMARY

However, when using this type of universal driver for configuring special settings, the special function settings windows must be installed in the universal driver in advance and, hence, it is necessary to allocate memory area for storing all of the special function settings windows. It is also necessary to identify that the special settings included in the special function settings window are configurable. Consequently, the structure of the universal driver becomes more complex.

In view of the foregoing, it is an object of the invention to provide a technology for using a universal driver to configure settings for specific image processors without greatly increasing the complexity of the universal driver's structure.

In order to attain the above and other objects, the invention provides a control device. The control device includes a storing unit, a first setting screen supplying unit, an acquiring unit, and a second setting screen supplying unit. The storing unit stores a universal driver outputting data toward a plurality of devices. The first setting screen supplying unit is configured to supply common setting screen data prepared by the universal driver to a display unit such that the display unit displays a common setting screen on which an item of a common setting and an item of a special setting are displayed in a selectable manner in response to the common setting screen data. A content of the common setting is applied to the plurality of devices and a content of the special setting is applied to a specific device among the plurality of devices. When the item of the special setting for the specific device is selected on the common setting screen, the acquiring unit is configured to acquire special setting screen data corresponding to the selected item of the special setting from an external device. The second setting screen supplying unit is configured to supply the special setting screen data to the display unit such that the display unit displays a special setting screen on which the content of the special setting for the selected item is settable.

According to another aspect, the invention provides an image processing system. The image processing system includes a storing device and a control device. The storing device stores special setting screen data corresponding to a specific device. The control device includes a storing unit, a first setting screen supplying unit, an acquiring unit, and a second setting screen supplying unit. The storing unit stores a universal driver outputting data toward a plurality of devices including the specific device. The first setting screen supplying unit is configured to supply common setting screen data prepared by the universal driver to a display unit such that the display unit displays a common setting screen on which an item of a common setting and an item of a special setting are displayed in a selectable manner in response to the common setting screen data. The content of the common setting is applied to the plurality of devices and a content of the special setting is applied to the specific device among the plurality of devices. When the item of the special setting for the specific device is selected on the common setting screen, the acquiring unit is configured to acquire special setting screen data corresponding to the selected item of the special setting from the storing device. The second setting screen supplying unit is configured to supply the special setting screen data to the display unit such that the display unit displays a special setting screen on which the content of the special setting for the selected item is settable According to another aspect, the invention provides a non-transitory computer readable storage medium storing a set of program instructions installed on and executed by a computer for controlling a control device on which a universal driver is installed. The universal driver outputs data toward a plurality of devices. The program instructions includes supplying common setting screen data prepared by the universal driver to a display unit such that the display unit displays a common setting screen on which an item of a common setting and an item of a special setting are displayed in a selectable manner in response to the common setting screen data, wherein a content of the common setting is applied to the plurality of devices and a content of the special setting is applied to a specific device among the plurality of devices, acquiring, when the item of the special setting for the specific device is selected on the common setting screen, special setting screen data corresponding to the selected item of the special setting from an external device, and supplying the special setting screen data to the display unit such that the display unit displays a special setting screen on which the content of the special setting for the selected item is settable.

BRIEF DESCRIPTION OF THE DRAWINGS

The particular features and advantages of the invention as well as other objects will become apparent from the following description taken in connection with the accompanying drawings, in which:

FIG. 9 is an explanation diagram illustrating transmission of data in special configuration process according to time series;

FIG. 10 is a chart showing a content of the advance window;

DETAILED DESCRIPTION

First Embodiment

A first embodiment of the invention will be described with reference to FIGS. 1 through 10.

1. Structure of an Image-Processing System

Figure 1:
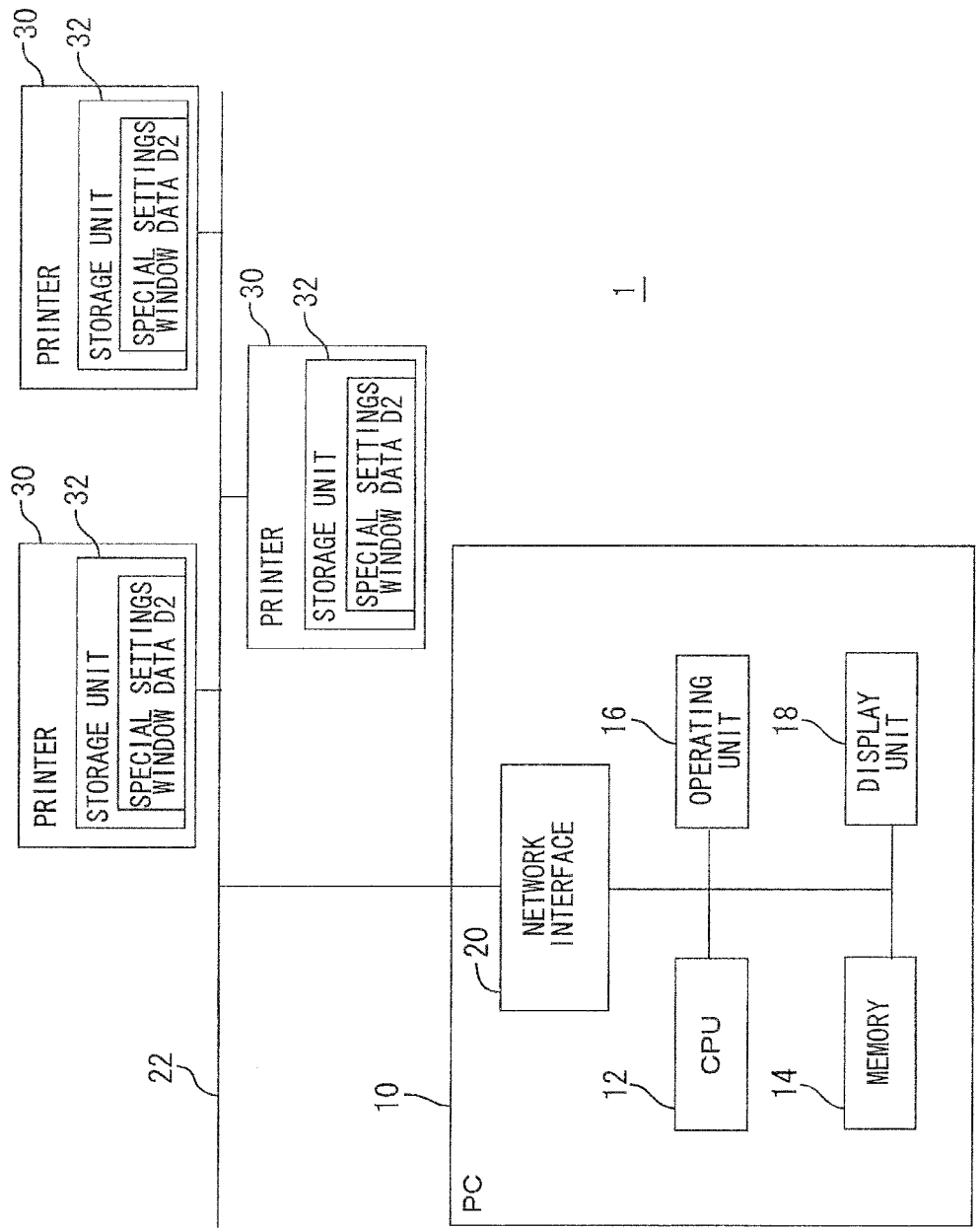
FIG. 1 is a block diagram showing an image-processing system according to a first embodiment.

FIG. 1 is a block diagram showing a sample structure of an image-processing system 1 according to the first embodiment. This system 1 includes a personal computer (hereinafter "PC") 10, and a plurality of printers 30.

The PC 10 includes a central processing unit (hereinafter "CPU") 12, a memory (including ROM, RAM, and a hard disk drive), an operating unit 16 including a keyboard and pointing device, a display unit 18 having a display screen, and a network interface 20.

Various programs are stored in the memory 14. The CPU 12 controls the PC 10 and the printers 30 based on programs read from the memory 14.

The network interface 20 is connected to a communication circuit 22 within an intranet, such as a local area network (LAN). The printers 30 are also connected to this communication circuit 22, and the PC 10 can perform data communications with the printers 30 via the network interface 20. In this example, the PC 10 is connected to the printers 30 via the communication circuit 22 configured of a LAN, but the PC 10 and the printers 30 may be connected wirelessly, for example, provided that they can communicate with each other.

The printers 30 connected to the communication circuit 22 may be of different types or models. Further, the printers 30 may be disconnected from the communication circuit 22, and other printers (not shown) in FIG. 1 may be newly connected to the communication circuit 22. In addition, the PC 10 may be a portable computer, such as a notebook-type computer, that connects to a separate network from that shown in FIG. 1 and is capable of accessing printers connected to the separate network from that shown in FIG. 1.

Figure 2:
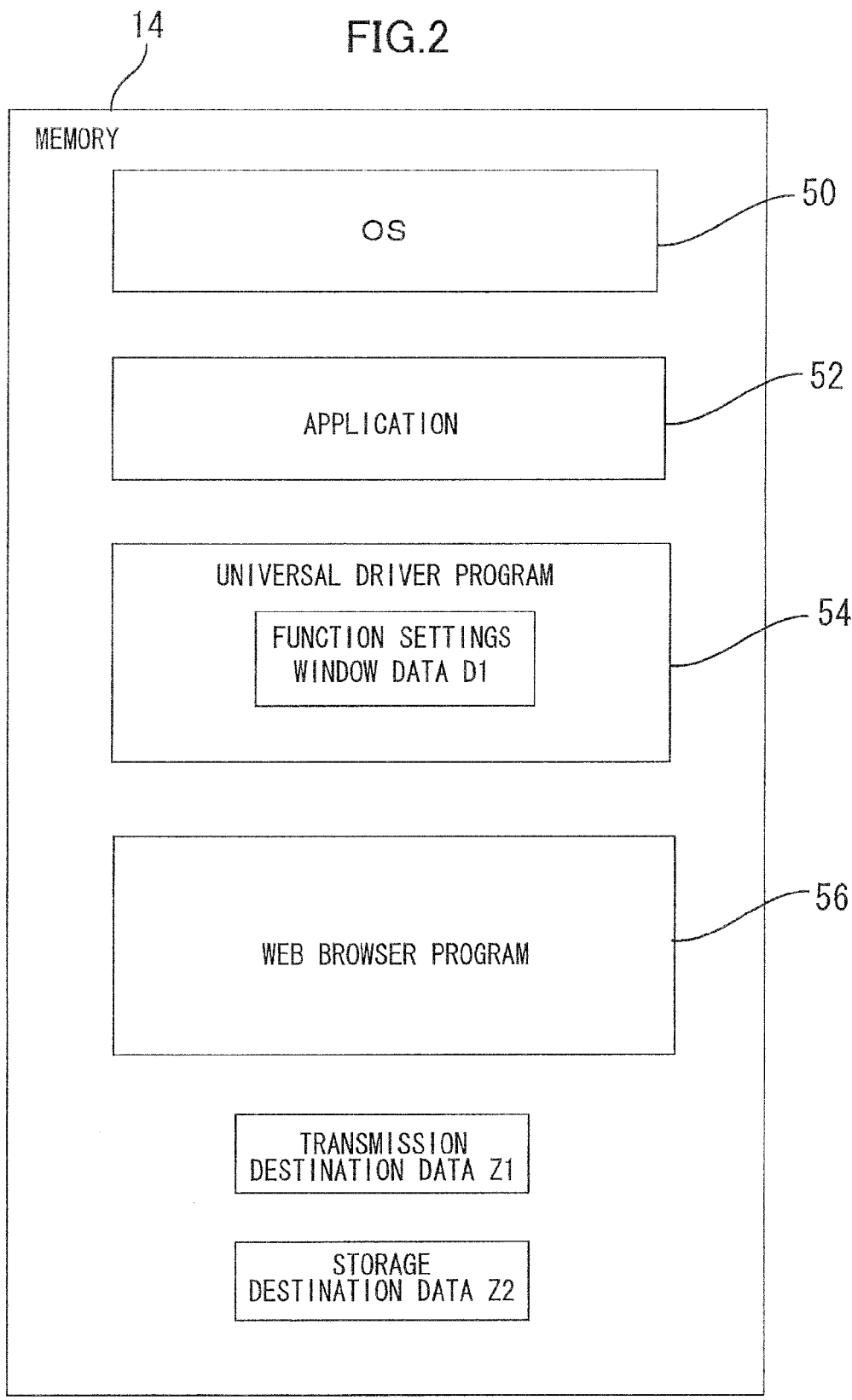
FIG. 2 is a block diagram conceptually illustrating programs and data stored in a memory.

FIG. 2 is a block diagram conceptually illustrating the programs and data stored in the memory 14. The memory 14 stores an operating system program (hereinafter "OS" 50), an application program (hereinafter "application") 52, a universal driver program (hereinafter "universal driver") 54, and a Web browser program (hereinafter "Web browser") 56.

The memory 14 also stores transmission destination data Z1 and storage destination data Z2. The transmission destination data Z1 indicates the location (address) of each printer 30 on the network. That is, the transmission destination data Z1 stores the location of each printer 30 in association with the name of the printer 30. The storage destination data Z2 indicates the location of the device (one of the printers 30, for example) storing special settings window data D2 described later. Since special settings window data D2 is stored in the printers 30 in the first embodiment, the location of the printers 30 specified in the transmission destination data Z1 and the location specified by the storage destination data Z2 are the same.

The OS 50 is provided with a basic program for controlling printing operations using installed printer drivers. The OS 50 is Microsoft's Windows (registered trademark), for example.

The application 52 is a program for handling text, graphics, photos, and the like and includes a function for generating print data.

The universal driver 54 is installed on the PC 10 as a printer driver. A plurality of printer ports associated with the universal driver 54 is registered in the OS 50.

The universal driver 54 is a program that can output instructions to the printers 30 for executing processes. The universal driver 54 is provided with function settings window data D1 for displaying function settings windows G1 on the display unit 18. The CPU 12 executes operations based on the universal driver 54 to supply the function settings window data D1 to the display unit 18 when the user inputs a command, for example. In other words, the CPU 12 functions as a function settings window supply unit for supplying the function settings window data D1 to the display unit 18 according to the universal driver 54.

Figure 3:
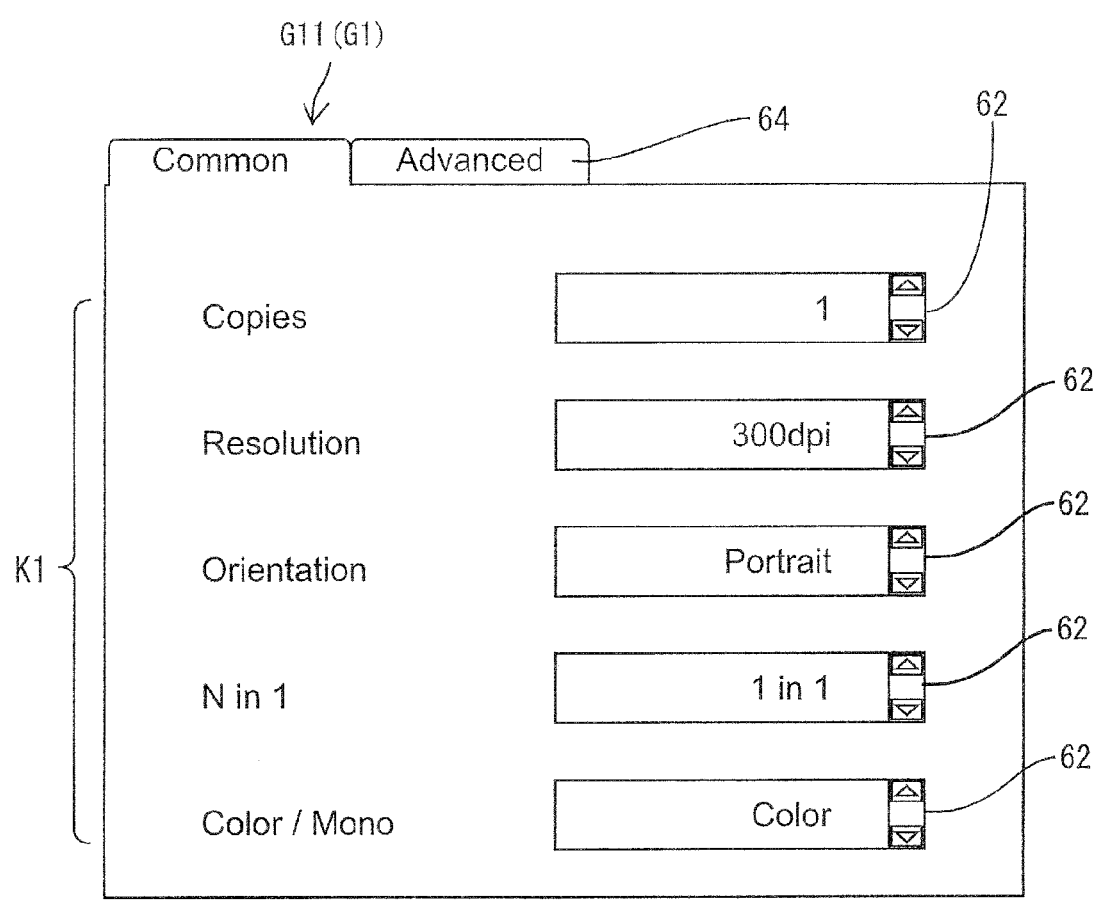
FIG. 3 is an explanation diagram conceptually illustrating a common window.
Figure 4:
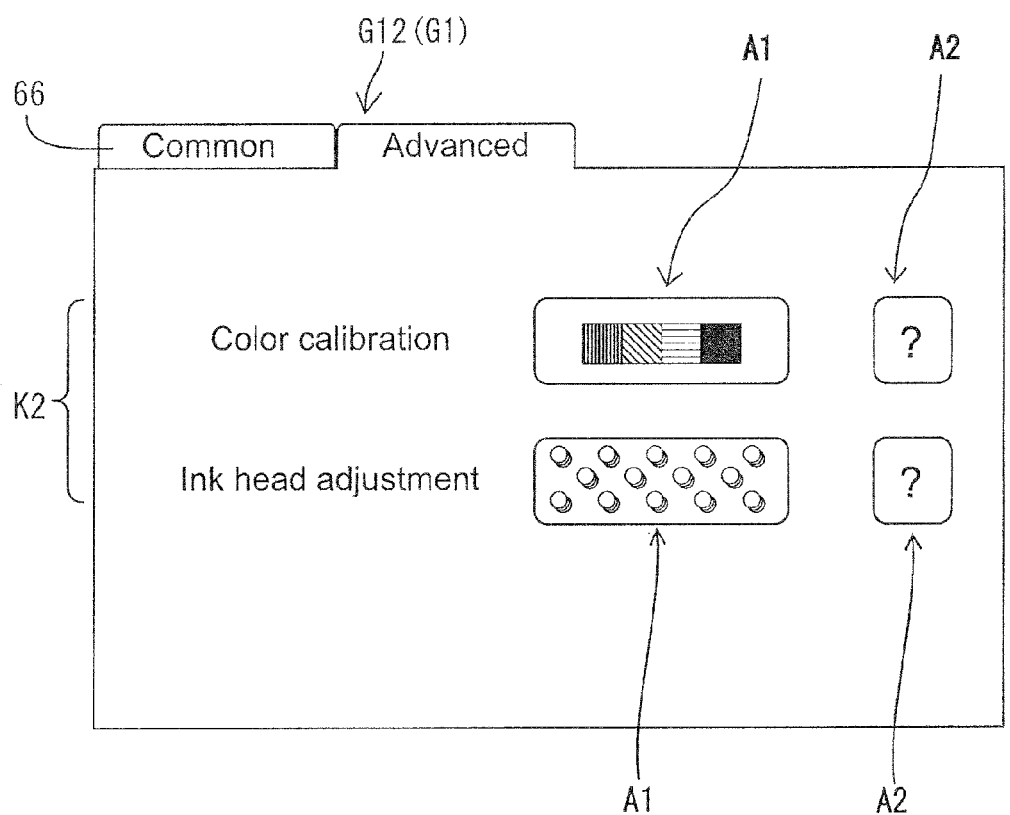
FIG. 4 is an explanation diagram conceptually illustrating an advanced window.

The function settings windows G1 include a common window G11 (see FIG. 3) and an advanced window G12 (see FIG. 4). The common window G11 is provided for configuring (selecting and setting) common settings K1, such as the number of copies, resolution, and the like that are common for all types of printers 30. Hence, the user can configure the common settings K1 for any printer 30 using the common window G11. The common window Gil includes an "Advanced" tab 64 for displaying the advanced window G12.

The common window G11 is a window for setting or modifying values of the common settings K1 (in FIG. 3, Copies is set to "1", Resolution to "300 dpi", for example). That is, the common window G11 displays names (items) of the common settings K1 and values of the common settings K1. Hence, the user can configure the common settings K1 in the common window G11 for any printer 30. To configure the common settings K1, the user selects the desired printer 30 and changes numerals or other values in setting fields 62 in the items of the common settings K1 corresponding to the selected printer 30, thereby configuring the values of the common settings K1 for the selected printer 30.

As shown in FIG. 4, the advanced window G12 is used to set (especially select or specify) one (item) of special settings K2, such as color calibration and ink head adjustment settings, to be applied to specific types of printers 30. The special settings K2 differ from the common settings K1. By using the advanced window G12, the user can configure (especially select or specify) one (item) of special settings K2 to be applied to the specific printer 30 (that is, the selected printer 30) but cannot configure common settings K1.

The advanced window G12 includes setting icons A1 and help icons A2 corresponding to each of the special settings K2. That is, the advanced window G12 displays names (items) of the special settings K2, the icons A1 and A2. Each of the setting icons A1 depicts an image based on each of the corresponding special settings K2. The storage destination data Z2 corresponding to each of the special settings K2 is linked to (incorporated in) the corresponding setting icons A1. The CPU 12 incorporates the storage destination data Z2 in the setting icons A1 included in the function settings window data D1 and displays the setting icons A1 on the display unit 18. Accordingly, the CPU 12 functions to incorporate the storage destination data Z2 in the function settings window data D1.

Each of the help icons A2 depicts a question mark and is associated with help data corresponding to each of the special settings K2. The advanced window G12 also includes a "Common" tab 66 for displaying the common window G11.

In order to configure the special settings K2, the user specifies (clicks on) a desired setting icon A1 in the advanced window G12. At this time, the CPU 12 performs an operation based on the Web browser 56 in order to access via the network interface 20 the specific printer 30 indicated in the corresponding storage destination data Z2. As shown in FIG. 1, each printer 30 is provided with a storage unit 32. The storage unit 32 stores the special settings window data D2 for the corresponding printer 30. The special settings window data D2 is data for displaying a special settings window G2 (see FIG. 5) for the printer 30 on the display unit 18.

The CPU 12 works in conjunction with the network interface 20 to acquire the special settings window data D2 from the corresponding storage unit 32. That is, the CPU 12 and the network interface 20 together implement a function for acquiring the special settings window data D2 from a source external to the PC 10. The CPU 12 adds an identification number to the acquired special settings window data D2 and stores this data temporarily in the memory 14. The identification number distinguishes one set special settings window data D2 from other sets of special settings window data D2.

The CPU 12 supplies the acquired special settings window data D2 to the display unit 18 using the Web browser 56. In other words, the CPU 12 performs an operation based on the Web browser 56 as a function for supplying the acquired special settings window data D2 to the display unit 18.

Figure 5:
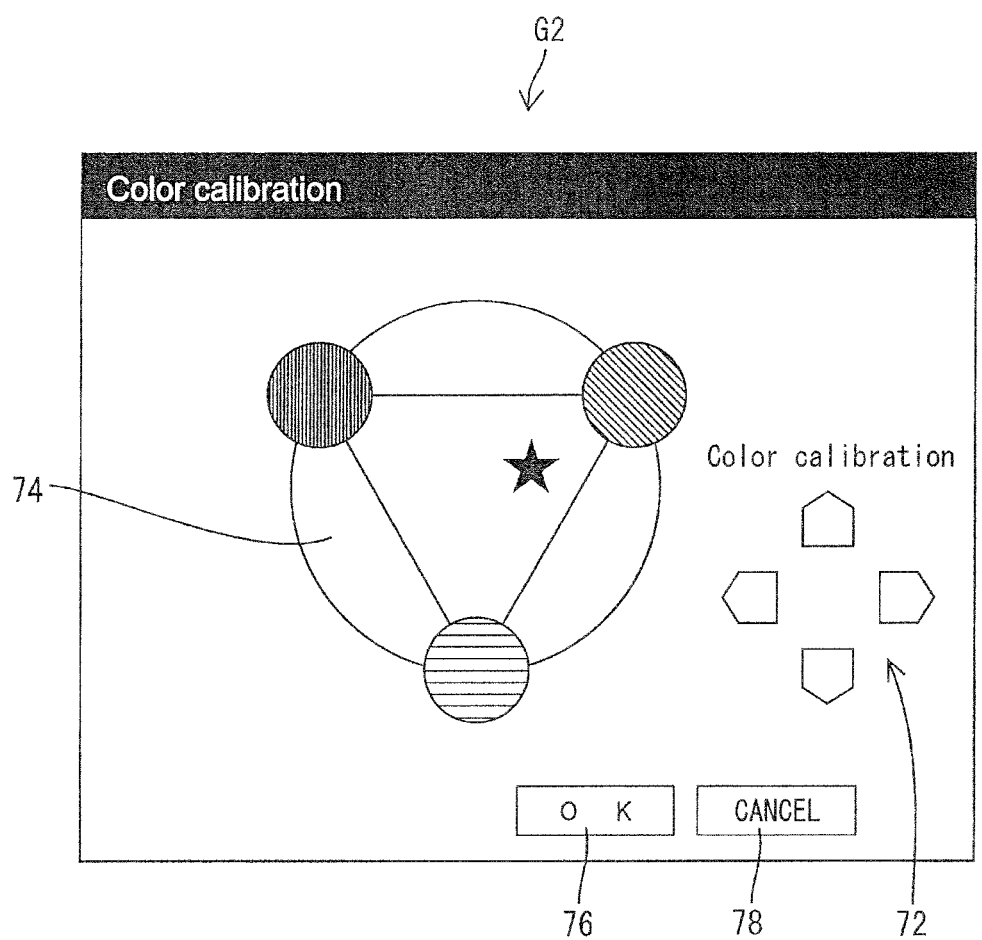
FIG. 5 is an example of a special settings window.

FIG. 5 shows the special settings window G2 displayed in the Web browser 56 for color calibration. The special settings window G2 is used to configure (set or modify) one of the special settings K2 (the color calibration setting in this case). The special settings window G2 includes operating buttons 72 used for calibrating the color, a hue diagram 74 indicating the color position after calibration, an OK button 76, and a Cancel button 78. In order to configure (set or modify) the special settings K2, the user operates the operating buttons 72 with the operating unit 16 to adjust the color position in the hue diagram 74 and clicks the OK button 76 when the desired color position is set. At this time, the CPU 12 transmits the calibration data to the printer 30 from which the special settings window data D2 was acquired, thereby setting the value of the specific setting K2. The user may also click the Cancel button 78 to keep the current value for the specific setting K2.

The universal driver 54 and the Web browser 56 are different programs and respectively supply the function settings window data D1 and the special settings window data D2 as independent window data. That is, the function settings window data D1 and the special settings window data D2 are different from each other. Since the special settings window G2 does not need to be incorporated in the function settings window G1, and the function settings window G1 does not need to be incorporated in the special settings window G2, the function settings window data D1 and the special settings window data D2 can be configured freely and independent of each other.

2. Configuration Process

Figure 6:
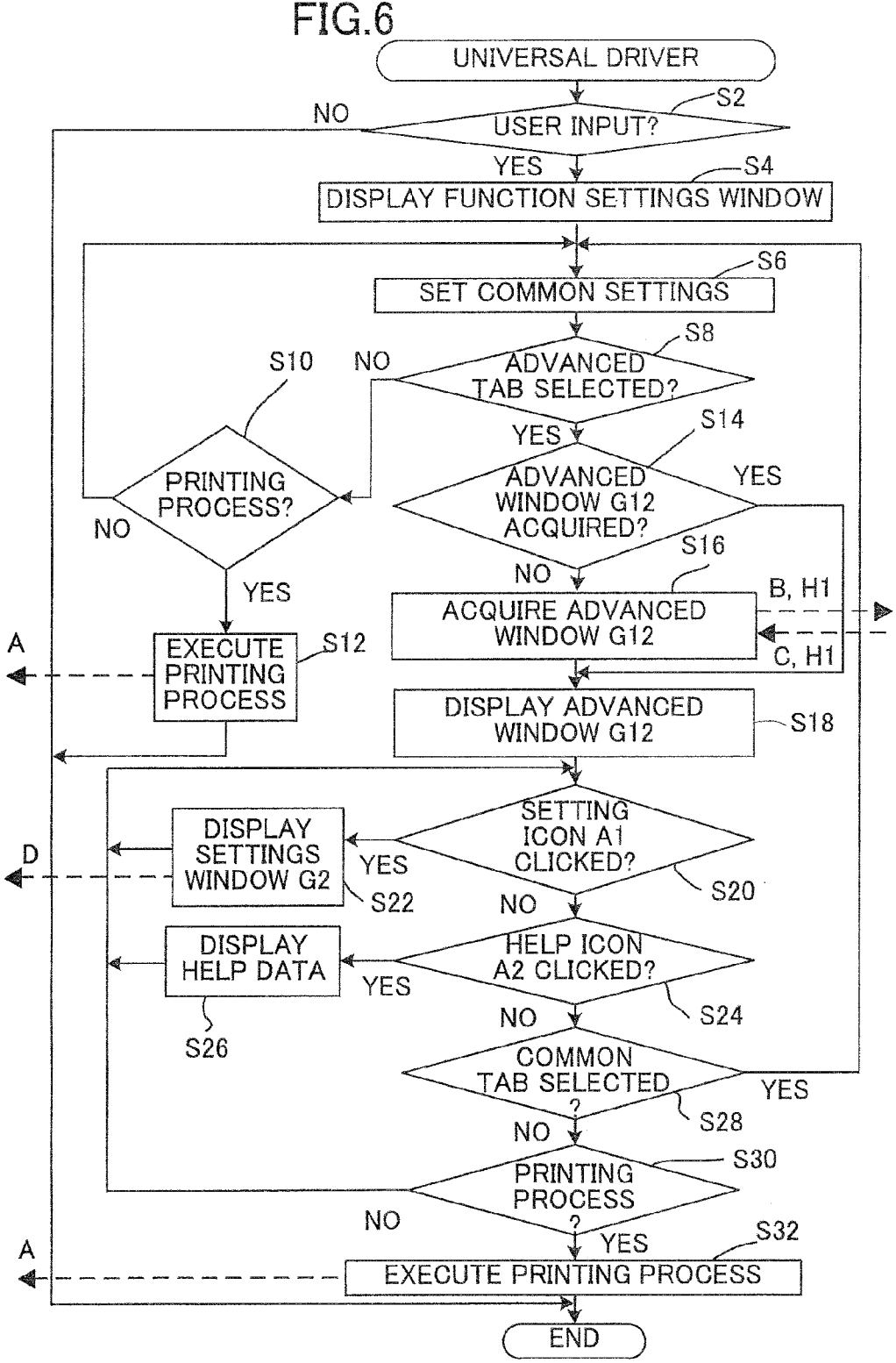
FIG. 6 is a flowchart illustrating a process executed by a universal driver program.
Figure 7:
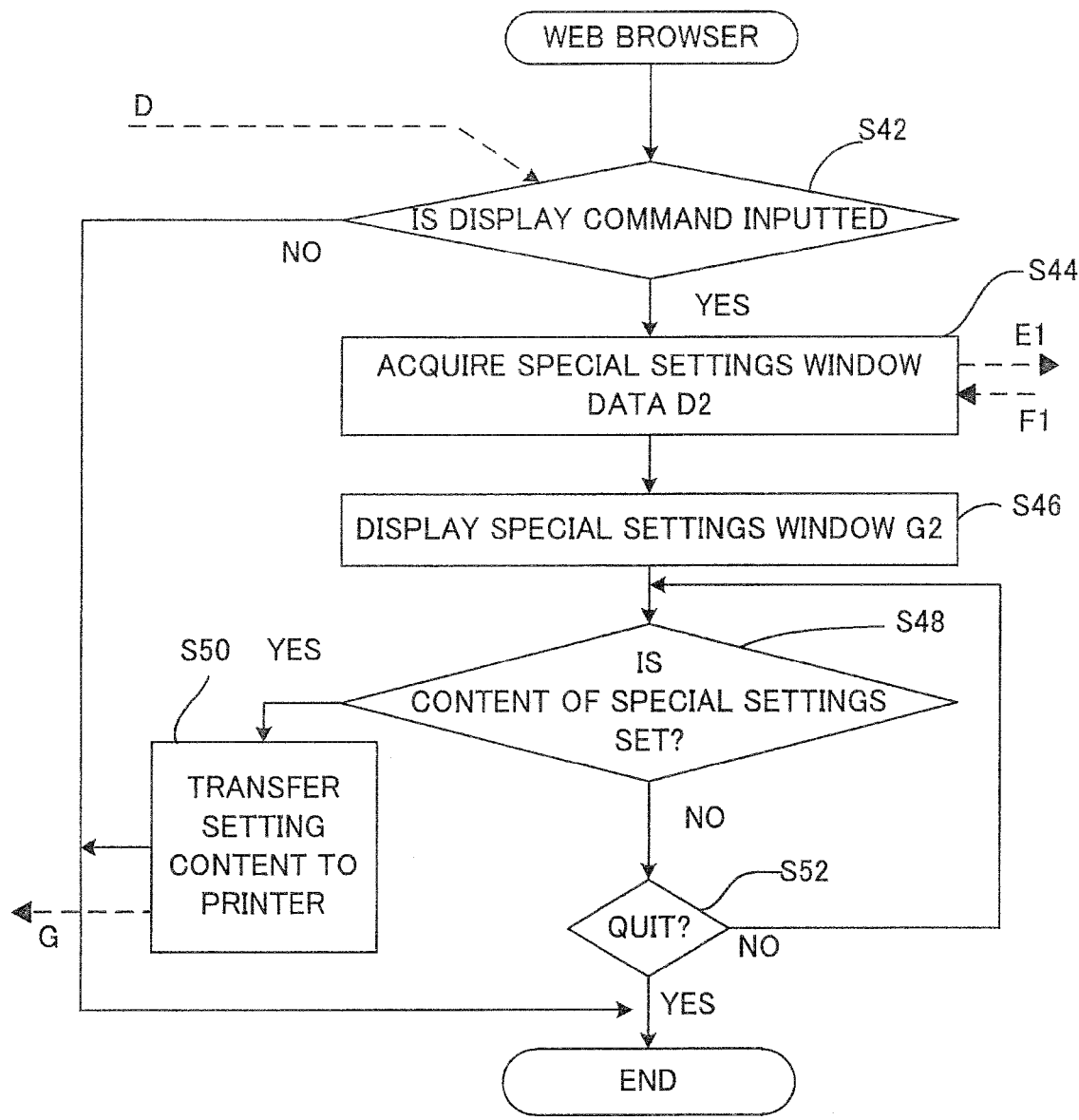
FIG. 7 is a flowchart illustrating a process executed by a web browser program.
Figure 8:
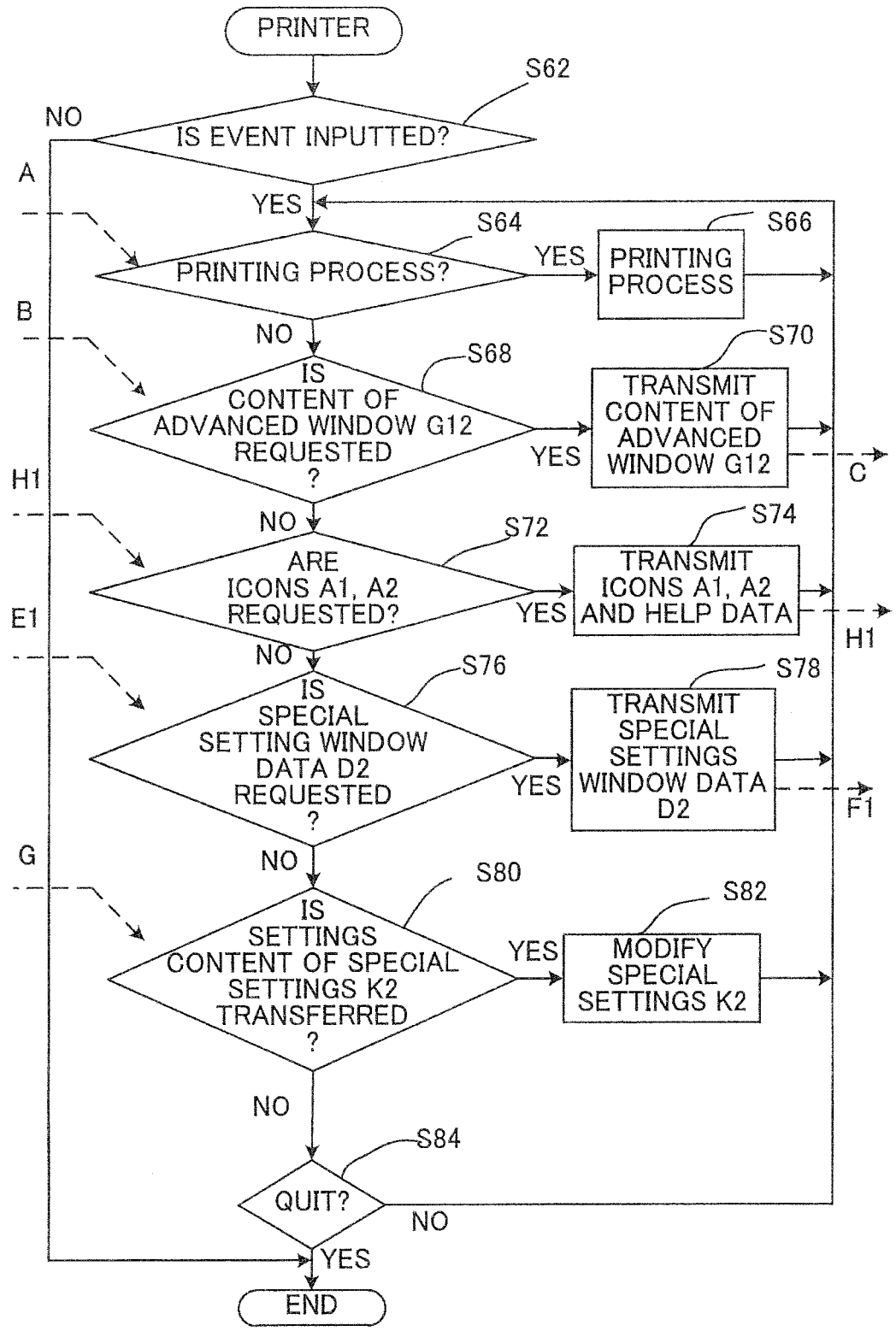
FIG. 8 is a flowchart illustrating a process executed by a printer.

Next, a configuration process for configuring settings for a printing process will be described with reference to FIGS. 6 through 9. FIGS. 6 through 8 are flowcharts illustrating steps in the configuration process executed by the CPU 12 and the printer 30. FIG. 9 shows the transmission of data and the like for each step in the special configuration process for configuring the special settings K2.

Universal Driver Process

First, the process performed by the CPU 12 based on the universal driver 54 will be described. In S2 of FIG. 6, the CPU 12 waits a fixed interval for the user to input a print command via the operating unit 16. If a print command is not inputted in the fixed interval (S2: NO), the CPU 12 ends the universal driver process. However, when the user has inputted a print command within the fixed interval (S2: YES), in S4 the CPU 12 displays the function settings windows G1 on the display unit 18 based on the universal driver 54. Here, the CPU 12 displays the common window Gil of the function settings windows G1 provided in the universal driver 54. This process assumes that a target printer 30 for executing the printing process was selected prior to or during input of the print command.

In S6 the CPU 12 sets the values for the common settings K1 in the common window G11. Here, "setting the values for the common settings K1" denotes saving values (including numeric values) that have been entered in the setting fields 62 by the user as print settings. At this time, the CPU 12 saves modified values as print settings each time the user changes a value in one of the setting fields 62. The first time the process in S6 is performed after performing the process in S4, the CPU 12 saves default values entered in the setting fields 62 as the print settings.

Next, in S8 the CPU 12 determines whether the "Advanced" tab 64 was selected in the common window G11. If not (S8: NO), in S10 the CPU 12 waits to execute the printing process. Specifically, the CPU 12 confirms whether the user has inputted a print execution instruction via the operating unit 16. If a print execution instruction was inputted (S10: YES), in S12 the CPU 12 executes the printing process based on the saved print settings. That is, the CPU 12 accesses the printer 30 indicated in the transmission destination data Z1 stored in the memory 14 and outputs instructions to the printer 30 to execute the printing process (see line A in FIGS. 6, 8, and 9). The printer 30 performs the printing operation according to these execution instructions. On the other hand, when a print execution instruction was not inputted (S10: NO), the CPU 12 returns to S6 and repeats the process in S6 through S10 described above.

When the CPU 12 determines in S8 that the user selected the "Advanced" tab 64 in the common window G11 (S8: YES), in S14 the CPU 12 verifies whether the content of the advanced window G12 has already been acquired from the memory 14. Normally, the advanced window G12 is provided in the universal driver 54 in advance, but the specific structure of the advanced window G12 may not be predefined. If the CPU 12 has already acquired the content of the advanced window G12 (S14: YES), in S18 the CPU 12 displays this content on the display unit 18.

On the other hand, if the content of the advanced window G12 has not yet been acquired (S14: NO), then in S16 the CPU 12 specifies the location assigned to the selected printer 30 in the transmission destination data Z1 and acquires the content of the advanced window G12 from the printer 30 indicated in the transmission destination data Z1. The CPU 12 issues a request to the printer 30 indicated in the transmission destination data Z1 for the content of the advanced window G12 (see line B in FIGS. 6, 8, and 9), and in response acquires the data shown in FIG. 10 from the storage unit 32 of the printer 30 (see line C in FIGS. 6, 8, and 9).

As shown in FIG. 10, the data acquired from the printer 30 includes the names of the special settings K2 (advanced function names), the storage destination data Z2 (advanced function URL), icon acquisition destination data (advanced function icon URL), and help data acquisition destination data (advanced function help URL). In the embodiment, the storage destination data Z2, the icon acquisition destination data, and the help data acquisition destination data all indicate the location of the target printer 30 that was preselected to execute the printing process.

The CPU 12 stores the storage destination data Z2 acquired in S16 in the memory 14. The CPU 12 further acquires the setting icons A1 and the help icons A2 from the icon acquisition destination indicated in the icon acquisition destination data. The CPU 12 also acquires help data from the help data acquisition destination indicated in the help data acquisition destination data (see line H1 in FIGS. 6, 8, and 9).

The CPU 12 links the acquired setting icons A1 with their corresponding storage destination data Z2, and associates the acquired help icons A2 with their corresponding help data. After completing the above process in S16, in S18 the CPU 12 displays the content of the advanced window G12 on the display unit 18.

In S20 the CPU 12 determines whether the user specified (clicked) one of the setting icons A1 in the advanced window G12. If the user clicked on one of the setting icons A1 (S20: YES), in S22 the CPU 12 displays the special settings window G2. Specifically, the CPU 12 launches the Web browser 56 and instructs the Web browser 56 to display the special settings window G2, while the universal driver 54 passes the identification number for the special settings window data D2 to the Web browser 56 (see line D in FIGS. 6, 7, and 9).

On the other hand, if the CPU 12 determines in S20 that the user has not clicked on one of the setting icons A1 (S20: NO), then in S24 the CPU 12 determines whether one of the help icons A2 was selected. If the user clicked on one of the help icons A2 (S24: YES), in S26 the CPU 12 executes a process to display the corresponding help data stored in the memory 14.

If the user has not clicked any of the setting icons A1 or the help icons A2 (S20: NO, S24: NO), in S28 the CPU 12 determines whether the user has selected the "Common" tab 66 in the advanced window G12. If so (S28: YES), the CPU 12 redisplays the common window G11 and repeats the process in S6 through S10 described above.

However, if the user has not selected any of the setting icons A1, the help icons A2, or the "Common" tab 66 (S20: NO, S24: NO, S28: NO), in S30 the CPU 12 waits to execute the printing process, i.e., waits a fixed time period for the user to input a print execution command. If the CPU 12 determines that a print execution command was inputted within the fixed time period (S30: YES), in S32 the CPU 12 executes the printing process based on the saved print settings.

At this time, the CPU 12 specifies the identification number passed to the Web browser 56 in S22 and outputs a command to the printer 30 indicated by the transmission destination data Z1 to execute the printing process (see line A in FIGS. 6 and 8). As a result, the printer 30 executes a printing process that reflects the settings in the special settings window G2. However, if the user has not inputted a print command (S30: NO), the CPU 12 returns to S20 and repeats the process in S20 through S28 described above.

Web Browser Process

Next, the process executed by the CPU 12 based on the Web browser 56 will be described. In S42 of FIG. 7, the CPU 12 waits a fixed time period for a display command inputted from the universal driver 54. If a display command is not inputted within the fixed time period (S42: NO), the CPU 12 ends the configuration process. However, when the user clicked on a setting icon A1 within the fixed time (S20: YES) and a display command was inputted from the universal driver 54 in S22 (S42: YES), in S44 the CPU 12 acquires the special settings window data D2 for displaying the special settings window G2.

The CPU 12 issues a request to the printer 30 indicated in the storage destination data Z2 linked to the setting icon A1 for the special settings window data D2 (see line E1 in FIGS. 7, 8, and 9) and in response requires the special settings window data D2 (Web page data) from the storage unit 32 of the printer 30 (see line F1 in FIGS. 7, 8, and 9). The universal driver 54 transfers an identification number together with the display command to the CPU 12, and the CPU 12 adds this identification number to the acquired special settings window data D2. In S46 the CPU 12 displays the acquired special settings window G2 on the display unit 18.

In S48 the CPU 12 determines whether content for the special settings K2 has been set in the special settings window G2. If so (S48: YES), in S50 the CPU 12 transfers the settings content to the preselected printer 30 and subsequently ends the configuration process for the special settings K2. The CPU 12 accesses the printer 30 in the transmission destination data Z1 stored in the memory 14 and transfers the settings content to the printer 30 (see line G in FIGS. 7, 8, and 9). More specifically, when the user operates the operating buttons 72 in the special settings window G2 for color calibration shown in FIG. 5, the CPU 12 changes the color position (indicated by a star in FIG. 5) in the hue diagram 74 and transmits the results of this change to the printer 30 in the transmission destination data Z1.

When the content of the special settings K2 has not yet been set (S48: NO), in S52 the CPU 12 determines whether to end the configuration process for the special settings K2. When the user has inputted a command to quit the display of the special settings window G2, for example (S52: YES), the CPU 12 ends the configuration process for the special settings K2. However, if such a command was not inputted (S52: NO), the CPU 12 repeats the process in S48 described above.

Process Performed on the Printer

Next, the process performed by the printer 30 will be described. In S62 of FIG. 8, the printer 30 waits a fixed time period for an event to be inputted from the PC 10 (the CPU 12). If an event is not inputted within the fixed time period (S62: NO), the printer 30 ends the process. However, if an event is inputted from the CPU 12 during the fixed time period (S62: YES), the printer 30 executes a process based on the inputted event.

Specifically, if the CPU 12 operating according to the universal driver 54 inputs a command to execute a printing process in S12 or S32 (S64: YES), in S66 the printer 30 executes the printing process.

If the CPU 12 operating according to the universal driver 54 requests content for the advanced window G12 in S16 (S68: YES), in S70 the printer 30 executes a process to transmit the content of the advanced window G12 to the PC 10.

If the CPU 12 operating according to the universal driver 54 has requested the setting icon A1 and the help icon A2 and the help data in S16 (S72: YES), in S74 the printer 30 executes a process to transmit the setting icon A1 and the help icon A2 and the help data to the PC 10.

If the CPU 12 operating according to the Web browser 56 has requested the special settings window data D2 in S44 (S76: YES), in S78 the printer 30 executes a process to transmit the special settings window data D2 (Web page data) to the PC 10.

If the CPU 12 operating according to the Web browser 56 has transferred settings content for the special settings K2 in S50 (S80: YES), in S82 the printer 30 executes a process to modify the special settings K2 according to the transferred setting content.

The printer 30 measures the time elapsed since an event was inputted from the CPU 12. If a subsequent event has not been inputted within a prescribed time (S84: YES), the process of the printer 30 ends. However, if another event is inputted within the prescribed time (S84: NO), the printer 30 repeats the above process in S64 through S82.

3. Effects of the First Embodiment (1) With the PC 10 according to the first embodiment, the universal driver 54 is provided with the function settings windows G1, which includes the advanced window G12 for configuring (especially selecting or specifying) one (item) of the special settings K2, and the user of the PC 10 can specify one (item) of the special settings K2 in this window. When configuring (setting or modifying) the special settings K2, the PC 10 acquires the special settings window G2 for setting the content of the special settings K2 from the printer 30 external to the PC 10. Hence, the universal driver 54 need not be provided with the special settings window G2 and need not manage the special settings K2 in a settable manner. This method prevents the structure of the universal driver 54 from becoming too complex.

(2) In the first embodiment, the common settings K1 and the special settings K2 are different from each other. In this way, settings that cannot be configured with the common settings K1 can be specified using the special settings K2.

(3) In the first embodiment, the function settings window data D1 and the special settings window data D2 are supplied to the display unit 18 as independent image data. This configuration eliminates the need to incorporate the special settings window G2 in the function settings windows G1 or to incorporate the function settings windows G1 in the special settings window G2, allowing the special settings window data D2 to be configured independently of the function settings window data Dl.

(4) The PC 10 according to the first embodiment supplies the function settings window data D1 to the display unit 18 using the universal driver 54 and supplies the special settings window data D2 to the display unit 18 using the Web browser 56. Therefore, the program for supplying the special settings window data D2 to the display unit 18 need not be included in the universal driver 54, preventing the universal driver 54 from becoming too complex.

(5) The PC 10 according to the first embodiment provides the special settings window data D2 to the display unit 18 using the Web browser 56. Generally, the Web browser 56 is installed on the PC 10 and is used to display the special settings window data D2 on the display unit 18, eliminating the need to install a program on the PC 10 for displaying the special settings window data D2. Further, since the Web browser 56 is generally a versatile all-purpose program, the special settings window data D2 can be displayed using such an all-purpose program.

(6) In the first embodiment, the advanced window G12 has help icons A2 for displaying help data. The special settings K2 are frequently unusual items to most users. Therefore, the function settings windows G1 provided in the PC 10 has the help icons A2 for displaying help data related to the special settings K2. Hence, when configuring the special settings K2, the user can learn more about the functions of the special settings K2 and properly configures them.

(7) The PC 10 according to the first embodiment adds an identification number to the special settings window data D2 acquired from the printer 30 in order to distinguish individual special settings window data D2. Accordingly, when acquiring a plurality of sets of special settings window data D2 from an external source, the PC 10 can distinguish individual special settings window data D2 based on the identification numbers in order to configure a plurality of special settings K2 without confusion.

(8) The PC 10 according to the first embodiment incorporates the storage destination data Z2 in the function settings window data D1 for specifying the location of the printer 30 in which the special settings window data D2 is stored. Hence, the PC 10 can easily learn the location of the printer 30 in which the special settings window data D2 are stored using the storage destination data Z2 incorporated in the function settings window data D1.

(9) In the first embodiment, the common window G11 included in the function settings windows G1 has a window for configuring the common settings K1. Hence, the user can configure the common settings K1 using the function settings windows G1. Unlike when configuring the special settings K2, the PC 10 need not acquire a window from the printer 30 for configuring the common settings K1.

(10) In the first embodiment, the PC 10 acquires the special settings window data D2 from the storage unit 32 of a specific printer 30 and displays the special settings window G2 using the special settings window data D2. Accordingly, since the PC 10 can acquire the special settings window data D2 corresponding to the specific printer 30 from the printer 30 itself, the PC 10 can store the special settings window data D2 as a simple system with clear correlations.

Second Embodiment

Figure 11:
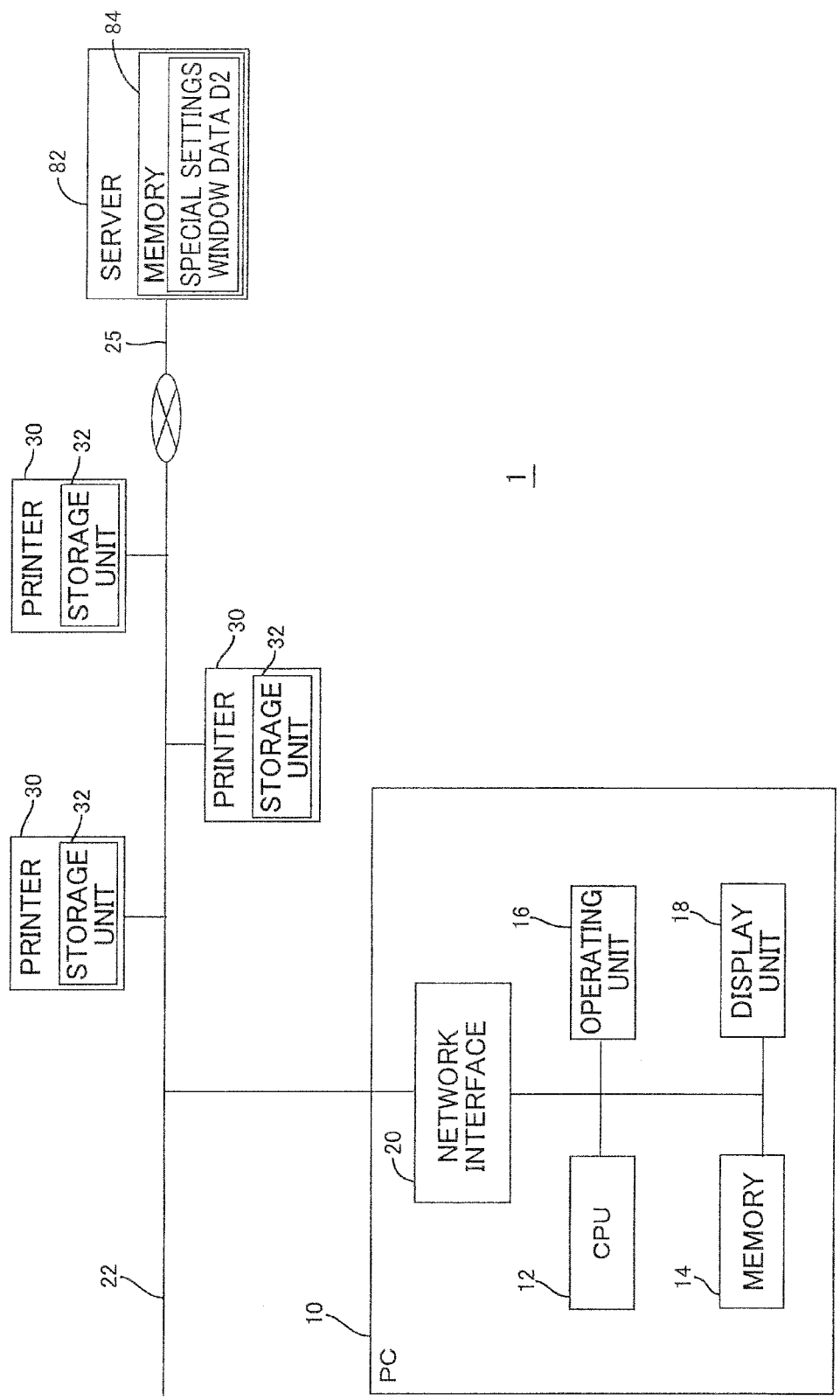
FIG. 11 is a block diagram showing an image-processing system according to a second embodiment.

Next, a second embodiment of the invention will be described with reference to FIGS. 11 through 14. As shown in FIG. 11, the image processing system 1 according to the second embodiment differs from the system 1 according to the first embodiment by being connected to an external network 25, such as an internet, via the communication circuit 22 and a router (not shown), and is connected to a server 82 present on the external network 25. Below, descriptions of similar structures and methods to those described in the first embodiment will not be repeated.

The server 82 has a memory 84 for storing downloadable setting icons A1, help icons A2, and special settings window data D2. The memory 14 of the PC 10 also stores the location (address) of the memory 84 in the server 82 as the storage destination data Z2. Therefore, the configuration process according to the second embodiment differs from the first embodiment, as described below.

1. Configuration Process

Figure 12:
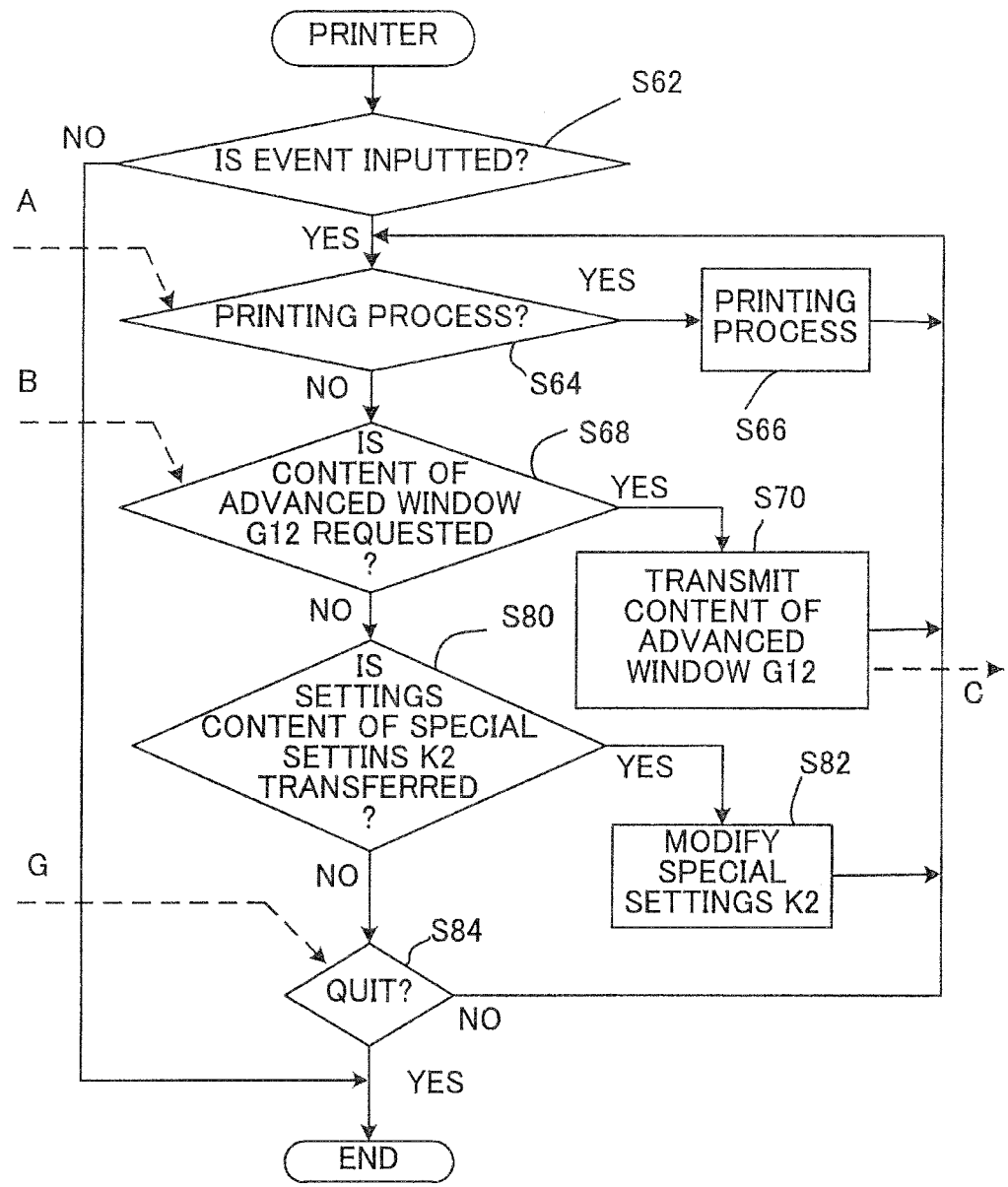
FIG. 12 is a flowchart illustrating a process executed by a printer according to the second embodiment.
Figure 13:
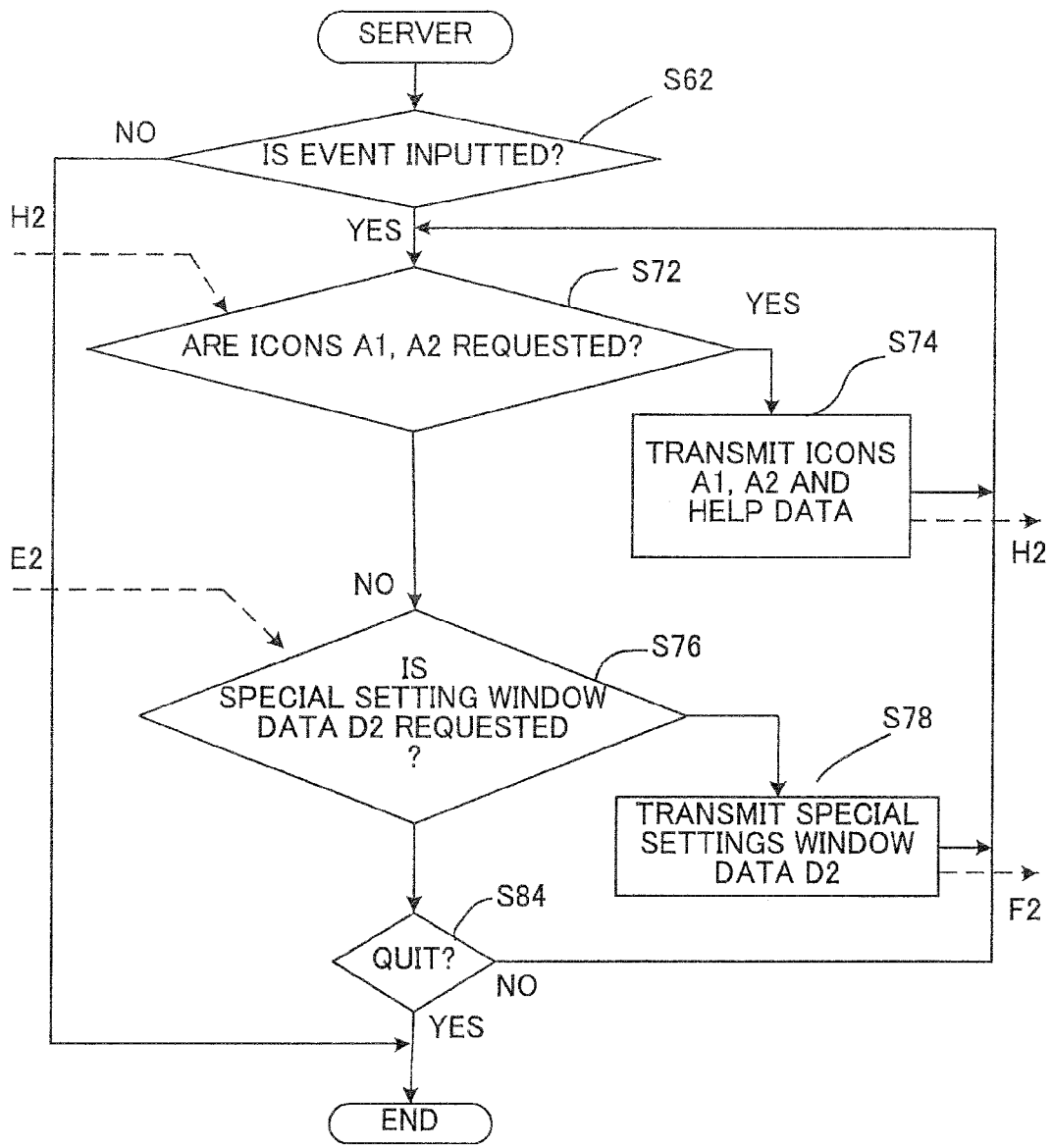
FIG. 13 is a flowchart illustrating a process executed by a server according to the second embodiment.
Figure 14:
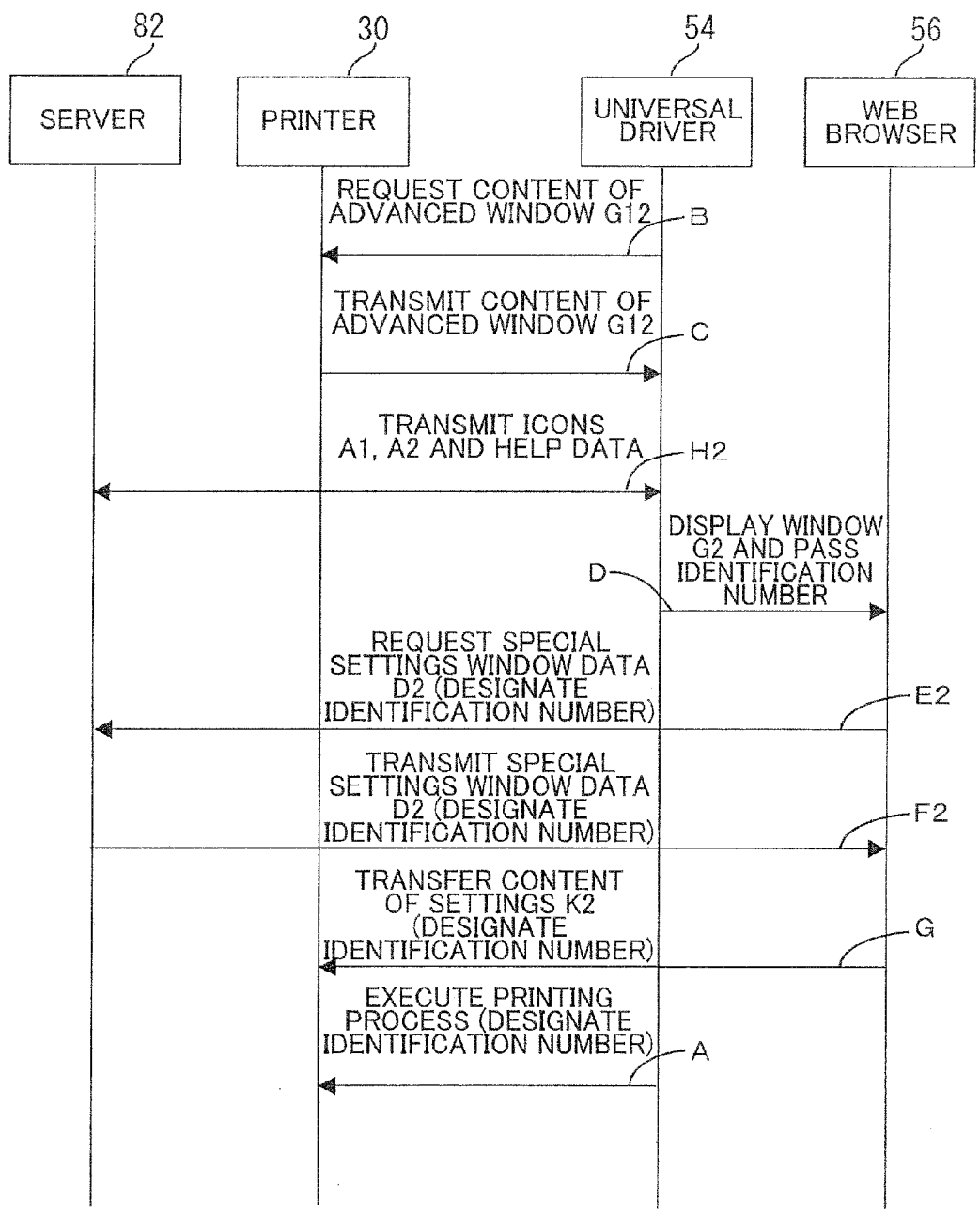
FIG. 14 is an explanation diagram illustrating transmission of data in special configuration process of the second embodiment according to time series.

A configuration process for configuring settings for a printing process will be described with reference to FIGS. 12 through 14. FIGS. 12 and 13 are flowcharts illustrating steps in the configuration process executed by the printer 30 and server 82. FIG. 14 illustrates the transmission of data and the like during the special configuration process for configuring special settings K2.

In S16 of FIG. 6 described in the first embodiment, the CPU 12 operating according to the universal driver 54 acquires the data shown in FIG. 10 from the printer 30 (see line C in FIGS. 6, 12, and 14) when acquiring the content of the advanced window G12. In the second embodiment, the icon acquisition destination data and the help data acquisition destination data indicate the location of the server 82. As shown in FIGS. 13 and 14, the CPU 12 acquires the setting icons A1 and the help icons A2 and the help data from the server 82 (see line H2 in FIGS. 13 and 14).

Further, in S44 of FIG. 7, when the CPU 12 is operating according to the Web browser 56 to acquire the special settings window data D2, the CPU 12 issues a request to the server 82 for the special settings window data D2 (see line E2 in FIGS. 13 and 14 and line E1 in FIG. 7) and acquires the special settings window data D2 from the memory 84 of the server 82 (see line F2 in FIGS. 13 and 14 and line F1 in FIG. 7). At this time, the CPU 12 sends the transmission destination data Z1 for the printer 30 to be configured by using the special settings window data D2 acquired above to the server 82. Hence, the CPU 12 can associate the special settings window data D2 acquired from the server 82 with the target printer 30. Here, lines E1 and F1 in S44 of FIG. 7 should be read as lines E2 and F2, respectively, in the second embodiment.

As shown in FIG. 12, the processes performed by the printer 30 are limited to the printing process (S66), the process to transmit data for the advanced window G12 (S70), and the configuration process (S82) and does not perform the processes in S74 and S78 described in the first embodiment (see FIG. 8), as these are performed by the server 82 described above. The server 82, instead of the printer 30, executes the processes S62, S72, S74, S76, S78, and S84 that is executed by the printer 30 in the first embodiment.

2. Effects of the Second Embodiment

Even though the special settings window data D2 is acquired from the server 82, which is external to the PC 10, and the server 82 differs from the printer 30 to which content of the special settings K2 is transmitted based on the acquired special settings window data D2, the PC 10 according to the second embodiment can use the transmission destination data Z1 to associate the special settings window data D2 with the target printer 30 in order to transmit the content of the configured special settings K2 to the correct printer 30.

Modifications

While the invention has been described in detail with reference to the embodiments thereof, it would be apparent to those skilled in the art that various changes and modifications may be made therein without departing from the scope of the invention.

(1) In the embodiments described above, color calibration and ink head adjustment are described as the special settings K2, but the special settings K2 are not limited to these examples. The special settings K2 may include other settings appropriate for a specific printer 30, such as an ink head purge setting, a secure print setting, and a secure function lock authentication setting. Further, while the device of the invention is described as a printer in the embodiments, the device may be a copier, multifunction device, scanner, facsimile device, or the like.

(2) In the embodiments, the CPU 12 acquires the content of the advanced window G12 when the user selects the "Advanced" tab 64 in the common window G11. However, the content of the advanced window G12 may be acquired when displaying the function settings windows G1, for example. This method can reduce the user's frustration of having to wait when displaying the advanced window G12 since no time is required to acquire the content of the advanced window G12 when the user clicks the "Advanced" tab 64.

(3) Further, the common window G11 and the advanced window G12 include different settings, but these settings are not fixed. For example, settings in the advanced window G12 that are used with great frequency may be incorporated in the common window G11, while settings in the common window G11 used with low frequency may be incorporated in the advanced window G12.

The technical elements described in this specification and illustrated in the drawings demonstrate the technical utility of the invention, either alone or in various combinations, but these elements are not limited to the combinations described in the claims filed with the application. Further, the technology described in the examples of the specification and drawings simultaneously attain a plurality of objectives, whereby the invention possesses technical utility by simply attaining one of these objectives.

What is claimed is:

1. A control device comprising:
a storing unit that stores a universal driver and destination data, the universal driver outputting data toward a plurality of devices, the destination data indicating a location of an external device;
a first setting screen supplying unit that is configured to supply common setting screen data prepared by the universal driver to a display unit such that the display unit displays a common setting screen on which an item of a common setting and an item of a special setting are displayed in a selectable manner in response to the common setting screen data, wherein a content of the common setting is applied to the plurality of devices and a content of the special setting is applied to a specific device among the plurality of devices;
an acquiring unit that, when the item of the special setting for the specific device is selected on the common setting screen, is configured to acquire special setting screen data corresponding to the selected item of the special setting from the external device based on the destination data stored in the storing unit; and
a second setting screen supplying unit that is configured to supply the special setting screen data acquired from the external device via the acquiring unit to the display unit such that the display unit displays a special setting screen on which the content of the special setting for the selected item is settable.

2. The control device according to claim 1, wherein the item of the common setting and the item of the special setting are different from each other.

3. The control device according to claim 1, wherein the common setting screen data and the special setting screen data are independent from each other.

4. The control device according to claim 1, wherein the first setting screen supplying unit supplies the common setting screen data to the display unit by using a first display program,
wherein the second setting screen supplying unit supplies the special setting screen data to the display unit by using a second display program.

5. The control device according to claim 4, wherein the second display program includes a web browser.

6. The control device according to claim 1, wherein the common setting screen includes an icon to display help information for the special setting.

7. The control device according to claim 1, further comprising an adding unit that adds an identification number to the special setting screen data, the identification number distinguishing the special setting screen data from another special setting screen data.

8. The control device according to claim 1, wherein the acquiring unit acquires transmission destination data indicating a location of the specific device corresponding to the special setting screen data when the acquiring unit acquires the special setting screen data,
the control device further comprising:
an associating unit that is configured to associate the special setting screen data with the transmission destination data; and a sending unit that, when the content of the special setting is set on the special setting screen that is based on the special setting screen data associated with the transmission destination data, is configured to send the content of the special setting that is set, toward the location of the specific device indicated by the transmission destination data.

9. The control device according to claim 1, wherein the acquiring unit acquires destination data indicating the location of the external device having the special setting screen data.

10. The control device according to claim 9, further comprising an incorporating unit that is configured to incorporate the destination data in the common setting screen data.

11. The control device according to claim 1, wherein the common setting screen includes a screen to set the common setting.

12. The control device according to claim 1, further comprising the display unit.

13. The control device according to claim 1, wherein the external device includes a printer.

14. An image processing system comprising:
a storing device that stores special setting screen data corresponding to a specific device; and
a control device comprising:
a storing unit that stores a universal driver and destination data, the universal driver outputting data toward a plurality of devices including the specific device, the destination data indicating a location of the storing device;
a first setting screen supplying unit that is configured to supply common setting screen data prepared by the universal driver to a display unit such that the display unit displays a common setting screen on which an item of a common setting and an item of a special setting are displayed in a selectable manner in response to the common setting screen data, wherein a content of the common setting is applied to the plurality of devices and a content of the special setting is applied to the specific device among the plurality of devices;
an acquiring unit that, when the item of the special setting for the specific device is selected on the common setting screen, is configured to acquire special setting screen data corresponding to the selected item of the special setting from the storing device based on the destination data stored in the storing unit; and
a second setting screen supplying unit that is configured to supply the special setting screen data acquired from the storing device via the acquiring unit to the display unit such that the display unit displays a special setting screen on which the content of the special setting for the selected item is settable.

15. A non-transitory computer readable storage medium storing a set of program instructions executable by a computer for controlling a control device on which a universal driver is installed, the computer having a storing unit storing destination data indicating a location of an external device, the universal driver being outputting data toward a plurality of devices, the program instructions comprising:
(a) supplying common setting screen data prepared by the universal driver to a display unit such that the display unit displays a common setting screen on which an item of a common setting and an item of a special setting are displayed in a selectable manner in response to the common setting screen data, wherein a content of the common setting is applied to the plurality of devices and a content of the special setting is applied to a specific device among the plurality of devices;
(b) acquiring, when the item of the special setting for the specific device is selected on the common setting screen, special setting screen data corresponding to the selected item of the special setting from the external device based on the destination data stored in the storing unit; and
(c) supplying the special setting screen data acquired from the external device to the display unit such that the display unit displays a special setting screen on which the content of the special setting for the selected item is settable.

16. The non-transitory computer readable storage medium according to claim 15, wherein the item of the common setting and the item of the special setting are different from each other.

17. The non-transitory computer readable storage medium according to claim 15, wherein the common setting screen data and the special setting screen data are independent from each other.

18. The non-transitory computer readable storage medium according to claim 15, wherein the supplying (a) supplies the common setting screen data to the display unit by using a first display program, and
wherein the supplying (c) supplies the special setting screen data to the display unit by using a second display program.

19. The non-transitory computer readable storage medium according to claim 18, wherein the second display program includes a web browser.

20. The non-transitory computer readable storage medium according to claim 15, wherein the acquiring (b) acquires transmission destination data indicating a location of the specific device corresponding to the special setting screen data when the acquiring (b) acquires the special setting screen data,
the program instructions further comprising:
(d) associating the special setting screen data with the transmission destination data; and
(e) sending, when the content of the special setting is set on the special setting screen that is based on the special setting screen data associated with the transmission destination data, the content of the special setting that is set, toward the location of the specific device indicated by the transmission destination data.

* * * * *